US008971974B2

(12) United States Patent
Weaver, III

(10) Patent No.: US 8,971,974 B2
(45) Date of Patent: Mar. 3, 2015

(54) COVER FOR HAND-HELD ELECTRONIC DEVICE

(75) Inventor: Robert B. Weaver, III, Caledonia, MI (US)

(73) Assignee: nflukz, llc, Hudsonville, MI (US)

( * ) Notice: Subject to any disclaimer, the term of this patent is extended or adjusted under 35 U.S.C. 154(b) by 740 days.

(21) Appl. No.: 13/385,588

(22) Filed: Apr. 28, 2011

(65) Prior Publication Data
US 2012/0294469 A1 Nov. 22, 2012

(51) Int. Cl.
*H04M 1/00* (2006.01)
*H04R 1/20* (2006.01)
*H04R 1/28* (2006.01)
*H04M 1/03* (2006.01)
*H04R 1/22* (2006.01)

(52) U.S. Cl.
CPC ............ *H04R 1/2857* (2013.01); *H04R 1/2896* (2013.01); *H04M 1/035* (2013.01); *H04R 1/227* (2013.01); *H04R 2499/11* (2013.01)
USPC ............... 455/575.8; 455/569.1; 455/350; 379/433.02; 379/433.11; 381/337; 381/339

(58) Field of Classification Search
CPC ........ H04R 1/02; H04R 1/227; H04R 1/2896; H04R 1/2853; H04R 1/2857; H04R 2499/11; H04M 1/035
USPC ............... 455/575.8, 569.1, 350; 379/433.02, 379/433.11, 437; 381/337, 339
See application file for complete search history.

(56) References Cited
U.S. PATENT DOCUMENTS

| | | |
|---|---|---|
| D348,472 S | 7/1994 | Cyfko |
| 5,416,463 A | 5/1995 | Higgins, Jr. et al. |
| 5,790,679 A | 8/1998 | Hawker et al. |
| 5,909,490 A | 6/1999 | Sokolich et al. |
| 5,963,640 A * | 10/1999 | Rabe .................. 379/433.02 |
| 6,148,080 A * | 11/2000 | Collin ................ 379/433.02 |
| 6,160,897 A | 12/2000 | Klein |
| 6,324,052 B1 | 11/2001 | Azima et al. |
| D466,107 S | 11/2002 | Lum |

(Continued)

FOREIGN PATENT DOCUMENTS

| | | |
|---|---|---|
| EP | 1916869 A2 | 4/2008 |
| KR | 10-2005-0053427 A | 6/2005 |

(Continued)

OTHER PUBLICATIONS

PCT International Search Report regarding Application No. PCT/US2014/030324 filed Mar. 17, 2014, a related application to U.S. Appl. No. 13/385,588.

(Continued)

*Primary Examiner* — Duc M Nguyen
(74) *Attorney, Agent, or Firm* — Warner Norcross & Judd LLP

(57) ABSTRACT

A cover for a hand-held device, which has a device body and a speaker, includes a cover body configured for covering a portion the device body and for covering the speaker and a channel for positioning adjacent the device body. The channel is configured to form a sound duct when mounted adjacent the back side of the device body and to be in communication with the speaker when the cover is mounted to the hand-held device for redirecting at least a portion of the sound waves emitted from the speaker to a location remote from the speaker.

19 Claims, 25 Drawing Sheets

(56) References Cited

U.S. PATENT DOCUMENTS

| | | |
|---|---|---|
| 6,616,111 B1 | 9/2003 | White |
| 6,631,191 B1 | 10/2003 | Holmberg |
| 6,697,636 B1 | 2/2004 | Hutchinson |
| 6,758,303 B2 | 7/2004 | Zurek et al. |
| 6,763,110 B1 | 7/2004 | Sung |
| 6,825,810 B2 | 11/2004 | Ragner et al. |
| D504,564 S | 5/2005 | Robertson, Jr. et al. |
| D517,310 S | 3/2006 | Aron et al. |
| 7,058,366 B2 | 6/2006 | Patterson |
| 7,092,745 B1 | 8/2006 | D'Souza |
| 7,103,393 B2 | 9/2006 | Hwang |
| 7,106,580 B2 | 9/2006 | Kugimiya et al. |
| D529,713 S | 10/2006 | Guyot et al. |
| 7,136,625 B2 | 11/2006 | Ylitalo et al. |
| 7,139,395 B2 | 11/2006 | Sung |
| 7,280,666 B2 | 10/2007 | Guyot et al. |
| D564,220 S | 3/2008 | Dixon |
| 7,400,910 B2 | 7/2008 | Matsumoto et al. |
| D579,202 S | 10/2008 | Grenier et al. |
| 7,474,747 B2 | 1/2009 | Esquivia-Lee et al. |
| 7,483,531 B1 | 1/2009 | Gordon |
| 7,483,543 B2 | 1/2009 | Cranfill et al. |
| 7,505,602 B2 | 3/2009 | Eaton |
| 7,522,741 B2 | 4/2009 | Klein |
| D592,188 S | 5/2009 | Huang |
| 7,538,820 B2 | 5/2009 | Tomoeda et al. |
| 7,583,938 B2 | 9/2009 | Kim |
| 7,599,724 B2 | 10/2009 | Cho et al. |
| 7,627,112 B2 | 12/2009 | Sung |
| 7,630,491 B1 | 12/2009 | Uyehara |
| 7,644,802 B2 | 1/2010 | Xu et al. |
| 7,778,431 B2 * | 8/2010 | Feng et al. ............. 381/160 |
| D624,068 S | 9/2010 | Peng et al. |
| D624,069 S | 9/2010 | Peng et al. |
| 7,796,773 B2 | 9/2010 | Klein |
| D626,123 S | 10/2010 | Peng |
| 7,881,759 B2 | 2/2011 | Eaton |
| D638,828 S | 5/2011 | Melanson et al. |
| D638,829 S | 5/2011 | Melanson et al. |
| D640,679 S | 6/2011 | Willes et al. |
| 8,005,517 B2 | 8/2011 | Kang et al. |
| D646,673 S | 10/2011 | Fathollahi |
| 8,028,794 B1 | 10/2011 | Freeman |
| D649,149 S | 11/2011 | Peng |
| 8,081,786 B2 | 12/2011 | Corley et al. |
| 8,086,285 B2 | 12/2011 | McNamara et al. |
| 8,098,867 B2 | 1/2012 | Hampton et al. |
| 8,180,075 B2 | 5/2012 | Nelson et al. |
| D665,167 S | 8/2012 | Haener et al. |
| 8,256,568 B2 * | 9/2012 | Lin ........................ 181/179 |
| D668,660 S | 10/2012 | Norfolk |
| D669,890 S | 10/2012 | Hopkins et al. |
| D670,280 S | 11/2012 | Rayner |
| 8,320,597 B2 | 11/2012 | Griffin, Jr. et al. |
| D671,933 S | 12/2012 | Rodgers |
| D673,545 S | 1/2013 | Magness et al. |
| D674,803 S | 1/2013 | Westrup |
| D674,804 S | 1/2013 | Cote |
| 8,382,059 B2 * | 2/2013 | Le Gette et al. ........... 248/460 |
| 8,433,377 B1 * | 4/2013 | Oh et al. ................. 455/575.1 |
| D681,613 S | 5/2013 | Magness et al. |
| D681,623 S | 5/2013 | Chang et al. |
| D686,629 S | 7/2013 | Trinh et al. |
| 8,479,875 B2 * | 7/2013 | Richardson et al. ......... 181/205 |
| D695,744 S | 12/2013 | Weller et al. |
| D696,241 S | 12/2013 | Paugh et al. |
| 2002/0009195 A1 * | 1/2002 | Schon ...................... 379/454 |
| 2002/0028693 A1 | 3/2002 | Johnson |
| 2002/0052216 A1 * | 5/2002 | Song ....................... 455/550 |
| 2003/0109314 A1 | 6/2003 | Ku |
| 2004/0112776 A1 | 6/2004 | Lord |
| 2005/0130716 A1 * | 6/2005 | Shin et al. .............. 455/575.1 |
| 2006/0258326 A1 | 11/2006 | Webb |
| 2007/0202956 A1 | 8/2007 | Ogasawara et al. |
| 2007/0223745 A1 | 9/2007 | Feng et al. |
| 2008/0130931 A1 | 6/2008 | Hampton et al. |
| 2008/0146294 A1 | 6/2008 | Corley et al. |
| 2008/0268793 A1 | 10/2008 | Nelson et al. |
| 2009/0009945 A1 | 1/2009 | Johnson et al. |
| 2009/0184145 A1 * | 7/2009 | Yeh ......................... 224/400 |
| 2010/0072334 A1 * | 3/2010 | Le Gette et al. ........... 248/176.3 |
| 2010/0206923 A1 * | 8/2010 | McNamara et al. ........ 224/191 |
| 2011/0170725 A1 * | 7/2011 | Liu ......................... 381/338 |
| 2011/0226545 A1 | 9/2011 | Richardson et al. |
| 2012/0027237 A1 * | 2/2012 | Lin ......................... 381/340 |
| 2012/0043247 A1 | 2/2012 | Westrup |
| 2012/0099751 A1 | 4/2012 | Hampton et al. |
| 2012/0275025 A1 | 11/2012 | Parrill |

FOREIGN PATENT DOCUMENTS

| | | |
|---|---|---|
| KR | 20-2011-0007308 U | 7/2011 |
| KR | 101146442 B1 | 5/2012 |
| TW | M394026 U1 | 12/2010 |
| WO | 2005/015682 A1 | 2/2005 |
| WO | 2012/051358 | 4/2012 |

OTHER PUBLICATIONS

PCT International Written Opinion regarding Application No. PCT/US2014/030324 filed Mar. 17, 2014, a related application to U.S. Appl. No. 13/385,588.

* cited by examiner

COVER FOR HAND-HELD ELECTRONIC DEVICE

TECHNICAL FIELD AND BACKGROUND OF THE INVENTION

The expanding cellular smart-phone and tablet PC devices have given rise to an expanding accessory market focused on providing case covers that serve a primary function of protecting the somewhat delicate devices from scratch, dent, and drop impact damage.

These same devices typically have both an internal headphone jack with which to listen to music, audible books, interact in phone calls and all other auxiliary audible functions of the devices. Along with the headphone jack, most if not all of these type devices include an internal monophonic or stereophonic set of speakers located somewhere within the device, typically along the perimeter edge or backside of the device.

Due to the extremely tight size and spatial constraints, and vital importance of the front screen face geometry, most of these internal speaker systems provide a minimal sound quality typically from one monophonic speaker sound source. This sound source is typically located upon the back face of the device, or near one extreme edge of the device. In each case, the majority of sound energy is directed away from the primary user of the device. The remaining sound energy that is directed towards the primary device user typically arrives to the user's ear as a weak monotone and asymmetrical sound source that is easily overpowered by moderate ambient perimeter noise. With the ever-expanding use of these devices to play games, listen to music, and, in some cases, to watch movies, a better sound quality would, therefore, be highly desirable.

SUMMARY OF THE INVENTION

Accordingly, the present invention provides an accessory or component that improves the sound quality of these devices.

In one form of the invention, a cover is provided that is configured to direct a more concentrated sound impulse back along the front perimeter corners and/or leading edges of the front face back towards the primary device user.

In one aspect, the cover or an insert for the cover is configured to form a channeled void space that is in communication with the one or more speakers of the device and that channels or redirects the sound waves from the speaker or speakers to a location or locations remote from the speaker, for example, around the perimeter of the device.

In a further aspect, the cover or insert seals around the speaker to capture substantially all, if not all, the sound waves so that the primary sound source energy can be concentrated and redirected to the location(s) remote from the speaker(s) to provide a more concentrated and desired sound quality to the primary user, as compared to what the same device sound source can provide to the primary user without the aid of the sound source manipulating properties of the invention.

In yet a further aspect, the cover is configured to have an impact absorbing configuration. For example, the cover may include portions that are enlarged or spaced from the device when mounted to the device so that the cover will absorb energy upon impact.

According to yet other aspects, the cover may be formed, such as by molding, e.g. plastic molding injection, or stamping, and may be formed from a rigid material, such a metal or plastic, including thermoplastics, or may be formed from a semi-rigid material, such as an elastomeric polymer, or from a non-rigid material, such a rubber or an elastomeric material, including a silicone based material.

In addition, the cover may be made from several materials and also may be formed from two or more components.

In yet other aspects, a secondary lower density material may be provided as the contact surfaces between the device outer surface, and the cover to serve as an air tight and sound isolating sealant. The sealant material may be attached by adhesives, mechanically attached, or applied within a secondary molding process. By use of a sealant to isolate the sound energy of the primary sound source speaker(s) mono or stereo, it will be possible to create a more efficient manipulation and redirection of the finite sound energy available with the device.

These and other objects, advantages, purposes, and features of the invention will become more apparent from the study of the following description taken in conjunction with the drawings.

DETAILED DESCRIPTION OF THE PREFERRED EMBODIMENTS

Figure 1:
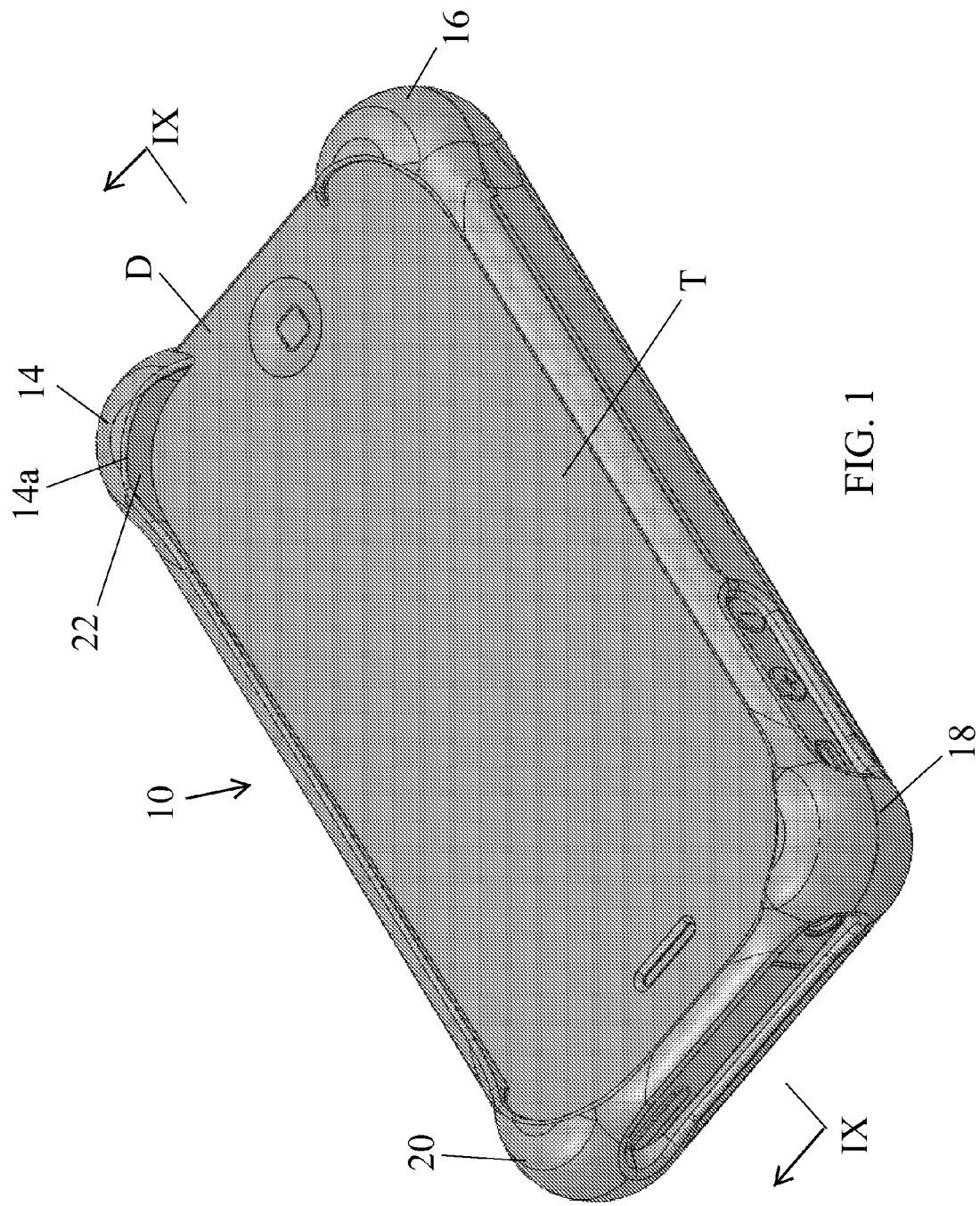
FIG. 1 is a perspective view of a cover of the present invention shown mounted to a handheld device in the form of a cell phone.
Figure 2:
FIG. 2 is a second perspective view of the cover and handheld device of FIG. 1.
Figure 3:
FIG. 3 is a top plan view of the cover and handheld device of FIGS. 1 and 2.
Figure 4:
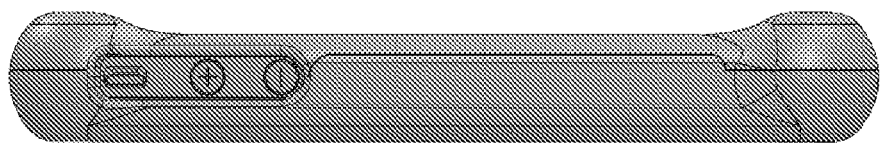
FIG. 4 is a side elevation view of the cover and device of FIG. 1.
Figure 5:
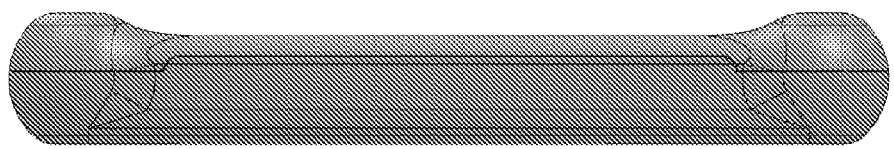
FIG. 5 is a right side elevation view of the cover and device of FIG. 3.
Figure 6:
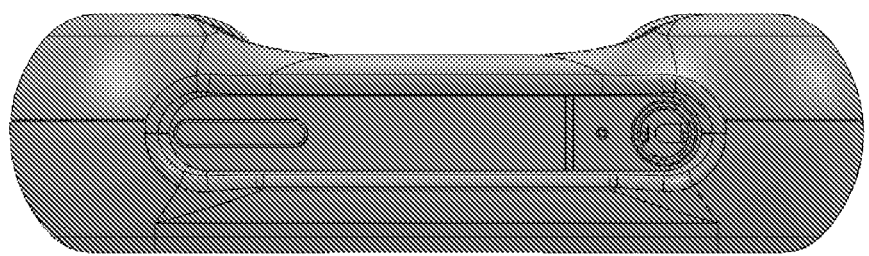
FIG. 6 is a left end elevation view of the cover and device of FIG. 1.
Figure 7:
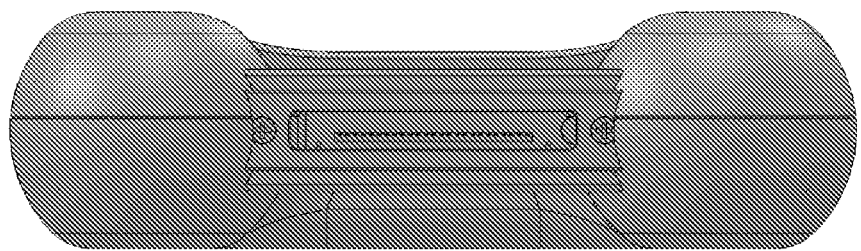
FIG. 7 is a right end elevation view of the cover and device of FIG. 1.

Referring to FIG. 1, the numeral 10 generally designates a cover for a handheld electronic device. In the illustrated embodiment, the handheld electronic device D comprises a cell phone and is illustrated with its touch screen display identified by the letter T. As will be more fully described below, cover 10 is adapted to harness the sound waves from one or more speakers or other sound emitting component or components on the handheld device and redirect the sound waves to a location or locations remote from the speaker (or sound emitting device) to reduce the "tinny sound" of the sound waves and provide a more pleasing sound for the user of the device.

Figure 8:
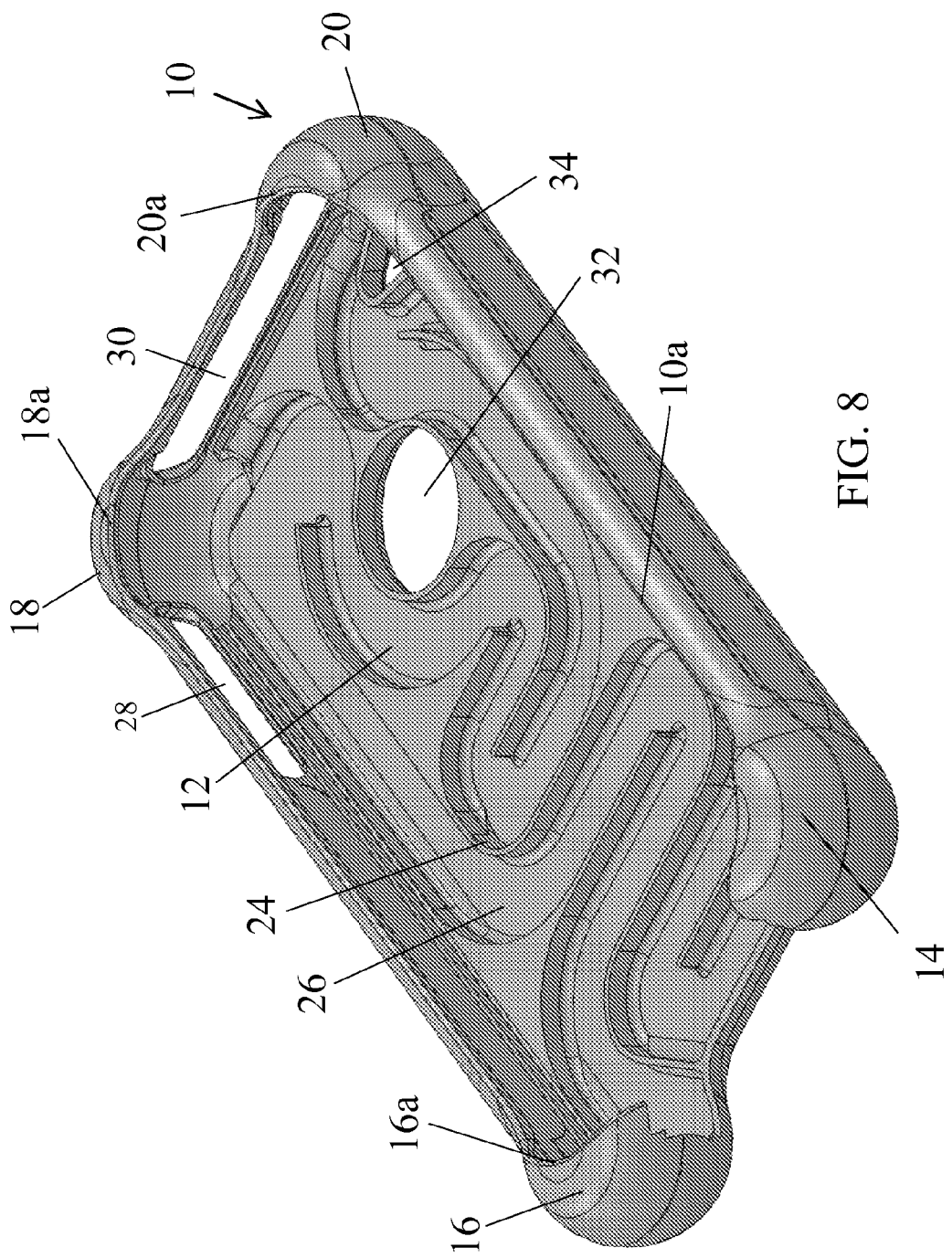
FIG. 8 is a perspective view of the cover of FIG. 2 with the handheld device removed to show the internal structure of the cover.

As best seen understood from FIGS. 1 and 8, cover 10 is adapted to cover at least a portion of the device and incorporates a channel that directs the sound waves emitted from at least one speaker or audio output component of the device to one or more locations remote from the speaker or output component. While hereinafter reference will be made to a "speaker", it should be understood that the term "speaker" is used broadly and is intended to cover any component that emits audible sound waves for a handheld device to convey, for example, music sounds, sound effects, voice sounds or the like.

In the illustrated embodiment, channel 12 has a convoluted path that extends across the cover, for example, from one end of the cover to the other end of the cover. Further, channel 12 extends and is in communication with enlarged regions or pockets formed in the cover at the corners of the cover, which envelope the corners of the device. With the exception of pocket 14, each pocket includes a lip that is spaced from the face of the handheld device, such as shown in FIG. 1, to allow the sound waves to be emitted for example at the corners of the handheld device around the outer perimeter of the device. This provides a more concentrated desired sound quality to the primary users as compared to what the same device sound source can be provided to the primary user without the aid of cover 10. Pocket 14 is adapted to enclose the device's speaker, and optionally seal against the front facing side of the handheld device around the speaker. In the illustrated embodiment, pocket 14 includes a downwardly depending wall 22 from its lip 14a that encloses the speaker that is located at that the corresponding corner of the device D. In this manner, a seal may be generated between the cover and the device around the sound source providing more direct concentrated sound impulse back through the channel to the other corners of the device and/or optionally to the leading edges of the front face of the device so that the sound is directed back toward the primary user from several different sources. Though it should be understood that wall 22 may enclose but without sealing the speaker so that at least some of the sound waves can also be emitted at that corner of the device as well.

Referring again to FIG. 8, channel 12 may be formed from upwardly extending flanges 24 that extend up from the back wall 26 of cover 10 and form the convoluted channel that extends across the back wall of the cover. Optionally, the upwardly extending flanges 24 may include a sealing surface along their upper perimeter edge for sealing against the back side of the device to thereby create an airtight and sealed sound duct that isolates the sound so that the sound can be channeled and redirected as noted above. For example, the sealing surface may be formed by the material forming the cover or attached by an adhesive, mechanically attached, or applied using a secondary molding process, such as by an injection molding process. By sealing the channel against the back surface of the device, sound energy of the primary sound source speaker or speakers (mono or stereo) provides a more efficient manipulation and redirection of the finite sound energy available from the device. As noted, the channel, when enclosed by the rearward facing side of the device, forms a sound duct to create an initial sound source located at or near the device sound source but then redirects the sound energy along and adjacent the back of the device creating one or more secondary sound source locations in and along the perimeter of the front leading edge screen perimeter of the device. Further, as the primary sound energy travels throughout the ducting system, there occurs an attenuation of the sound due to multiple factors.

One primary factor in the attenuation of the internally ducted sound energy is the increase in distance traveled between the primary sound source and its distance of travel through a medium (in this case atmospheric pressured air). Because of the attenuation of sound energy over a distance between the primary sound source and a secondary source distance, it is necessary to provide a feature that can compensate for and balance out an approximately equal sound energy level to be measure at each sound source location along the sound ducting system. The parameters that can be controlled include, for example, the variation and restriction of the ducting cross section and the end orifice size at the primary and/or second, third, fourth or nth sound port. Restriction in duct cross section and/or sound port opening size will allow to balance resulting sound levels at all ports (sound ports) regardless of the level of internal sound energy within adjacent ducting. One goal is to create a balanced and even sound level along the entire screen perimeter.

The sound quality can also be manipulated running a series of sound ports coming from the ducting system. By maximizing the length of travel of the sound wave from initial primary source sound port to the last sound port within the ducting system series, and providing a single additional or multiple sound ports at equal and varying lengths along the ducting system; it is possible to have the initial sound wave being delayed from sound port to adjacent sound port as a function of distance of travel from sound port to sound port and the speed of sound. For example, 24" between initial and final sound port can create and approximate a 2 millisecond delay in the same sound energy being transmitted to the device users hearing. This can serve to reinforce the primary sound quality and provide a richer and fuller listening experience for the device user without any manipulation of the device or its electronics.

To accommodate the buttons, various ports, and other devices, such as cameras, on the handheld device, cover 10 may incorporate several access openings. For example, cover 10 may include an opening 28 along its lateral side edge to accommodate control buttons, an opening 30 along its transverse side to, accommodate a power cord receptor, and, for example, an opening 32 in its back wall 26 to reveal the phone logo. Additional openings may be provided for example opening 34 and its back wall 26 to accommodate for example a camera.

Cover 10 may be formed from a variety of different materials, including a rigid material, a semi-rigid material and a flexible material. Further, cover 10 may be formed from a material that provides impact resistance, such a thermoplastic material or an elastomeric material, as noted below. Suitable materials for cover 10 may include metal, plastics, including thermoplastics, an elastomeric material or combination thereof, and, further, may be molded, such as by plastic molding injection, stamped out or formed using a conventional process. When formed form a semi-rigid material, such as a silicone based rubber/plastic, the cover may then be stretched over the device and, therefore, can be molded as a one-piece cover. Furthermore, the channel may be created by an insert that is separately formed (for example from a similar material to cover 10 or a different material) and then inserted into the cover and either adhered to the cover, for example, by an adhesive, welding, or the like, or may be mechanically attached with an optional seal interface between the insert and the cover back wall.

Referring to FIG. 8, as previously noted, the lips 16a, 18a, and 20a of the pocketed areas may be spaced from the front-facing side of the device. Optionally, the remaining inner perimeter of the cover may be sealed against the front facing side, for example the touch screen display T so that the sound is emitted only from discrete locations, as previously noted, namely at pockets 16, 18, and 20 (between the cover and the device). The inner perimeter 10a of cover may be formed to create the seal between the pockets or may be sealed by a secondary material formed or applied to the cover.

Although cover 10 is illustrated as extending around and covering only a portion of the devices outer perimeter, cover 10 may be adapted to extend around the full outer perimeter of the device as well but with access opening where needed. Additionally, a portion of the cover for example one end or a portion of the back, may be removable to allow unobstructed access, for example, to the electrical connectors of the device. Further, as will be more fully described below, the cover may be adapted to extend only across a portion of the back side of the handheld device.

Figure 13:
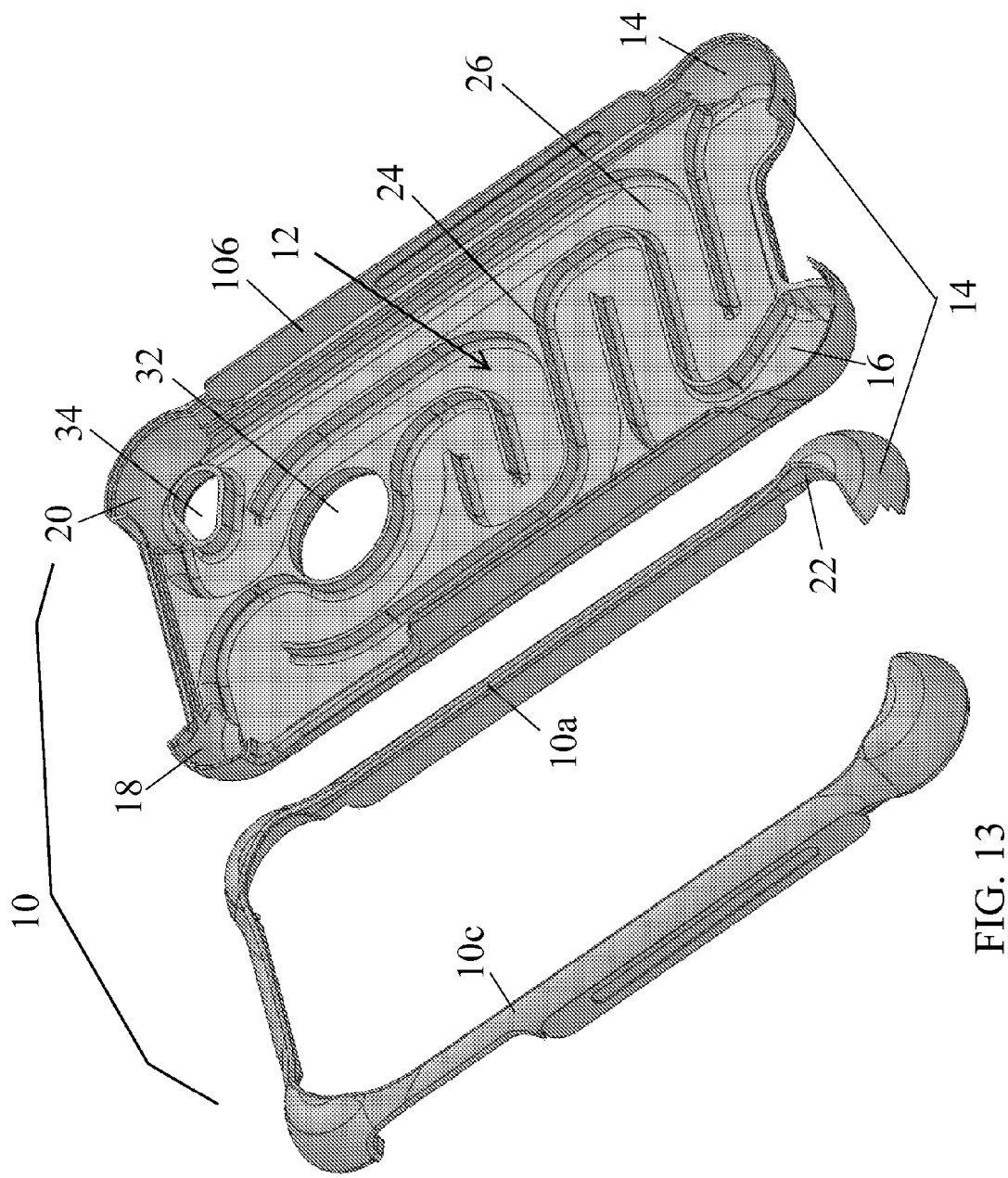
FIG. 13 is an exploded perspective view of the cover of FIG. 8 illustrating a two-piece construction of a cover.
Figure 14:
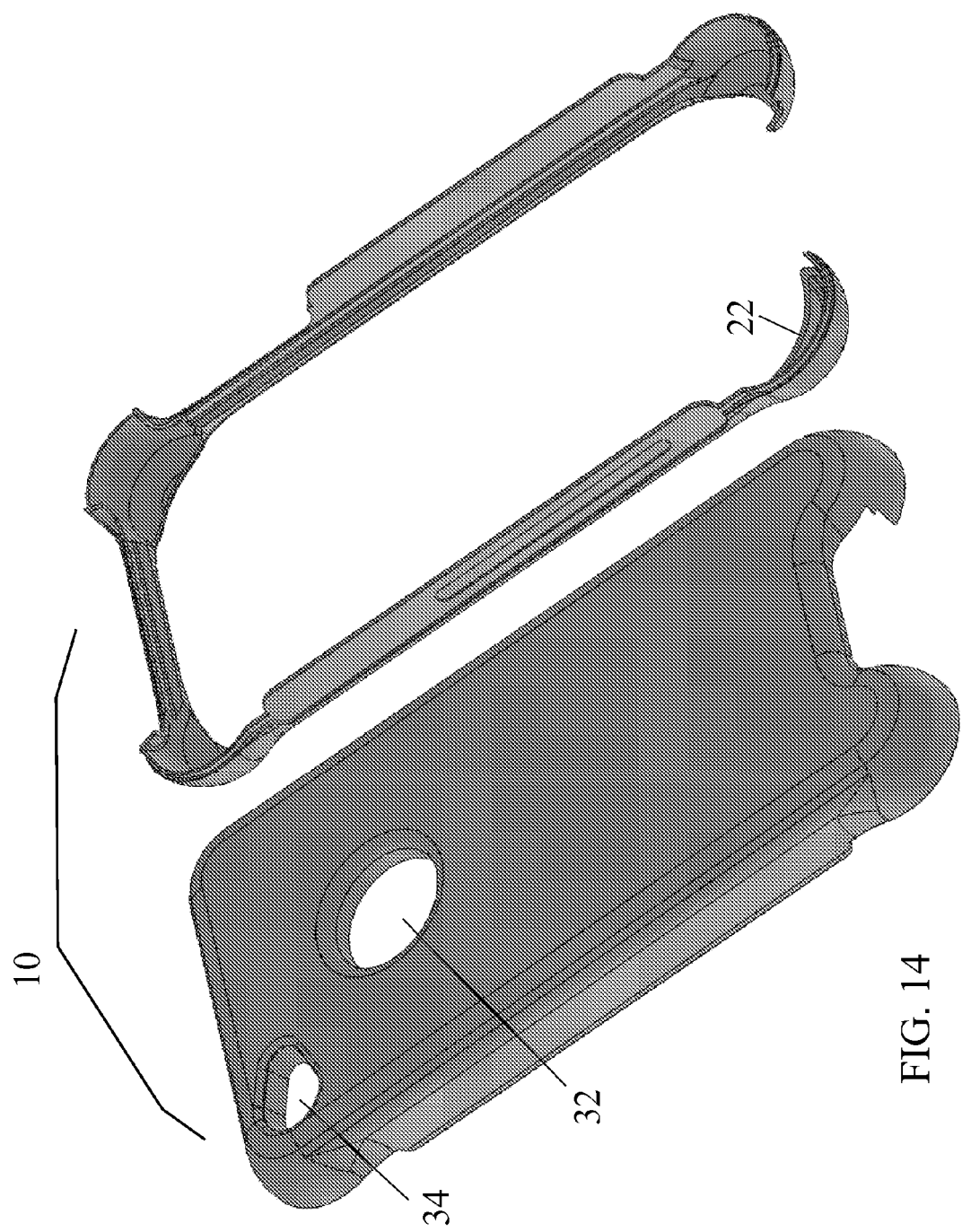
FIG. 14 is a bottom exploded perspective view of the cover of FIG. 13.

Referring again to FIGS. 13 and 14, as previously noted, cover 10 may be formed from two components that are snap-fit together or may be permanently joined together, such as by welding or by way of an adhesive. For example, the base 10b of the cover 10 may provide the cover back wall 26 and the channel 12 and, further, form part of the pockets 14, 16, 18, and 20. The other portion of the pockets may be formed by the top half 10c of cover 10, which also forms the inner perimeter 10a of the cover 10.

Figure 9:
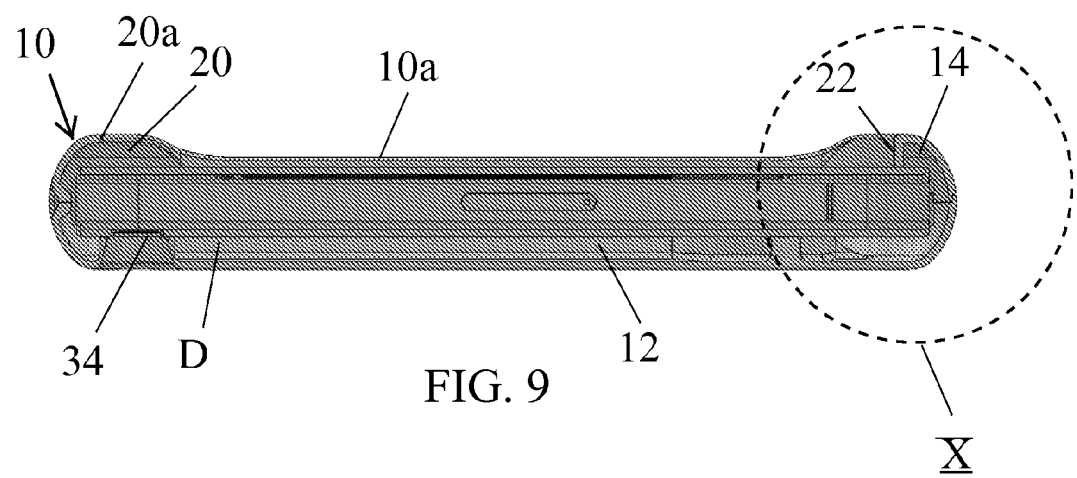
FIG. 9 is a cross section view of the cover and device taken through line IX-IX of FIG. 1.
Figure 10:
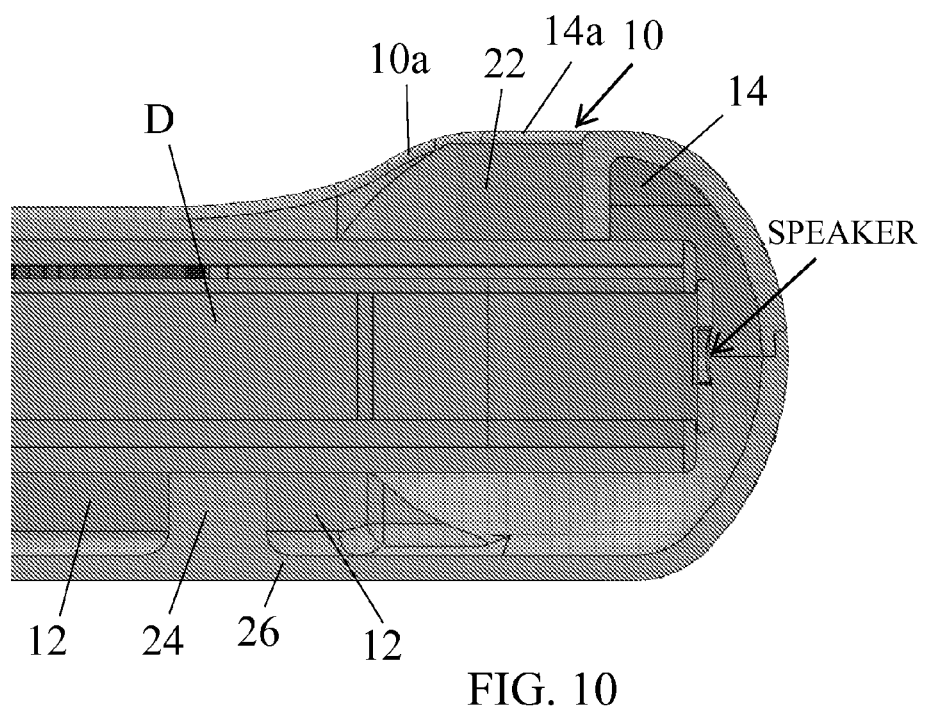
FIG. 10 is an enlarged view of detail X of FIG. 9.
Figure 11:
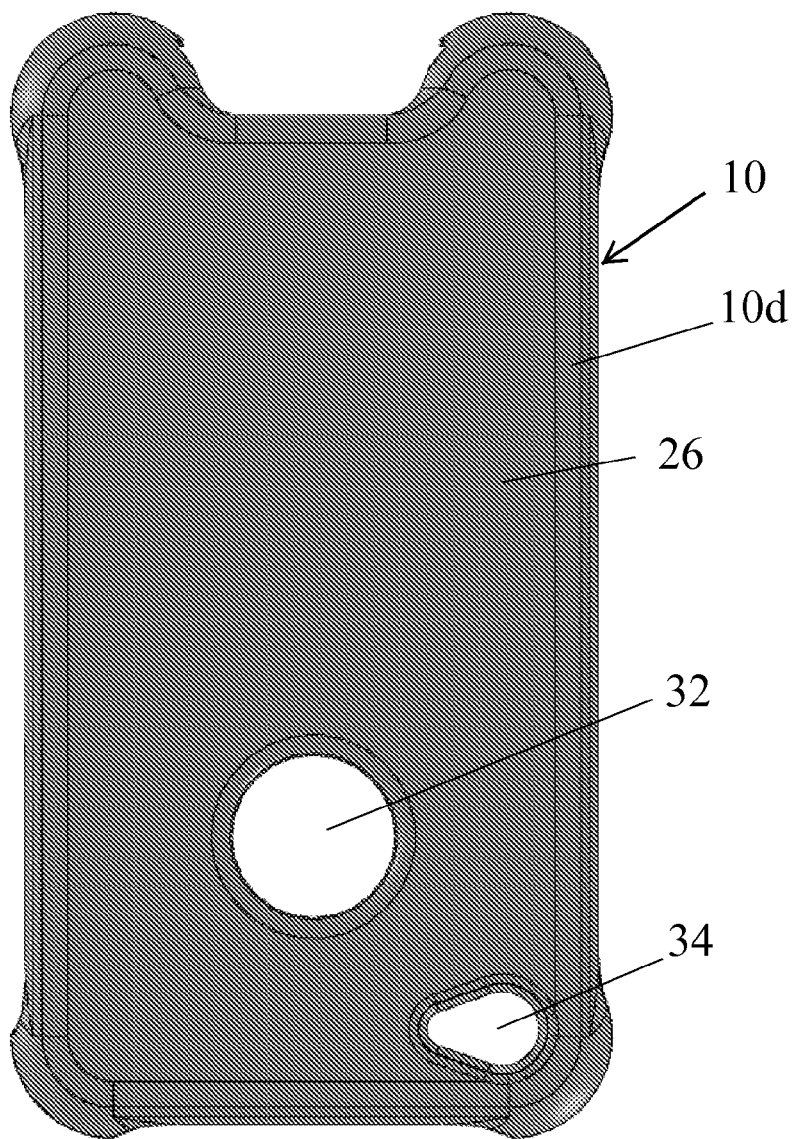
FIG. 11 is a bottom plan view of the cover of FIG. 9.
Figure 12:
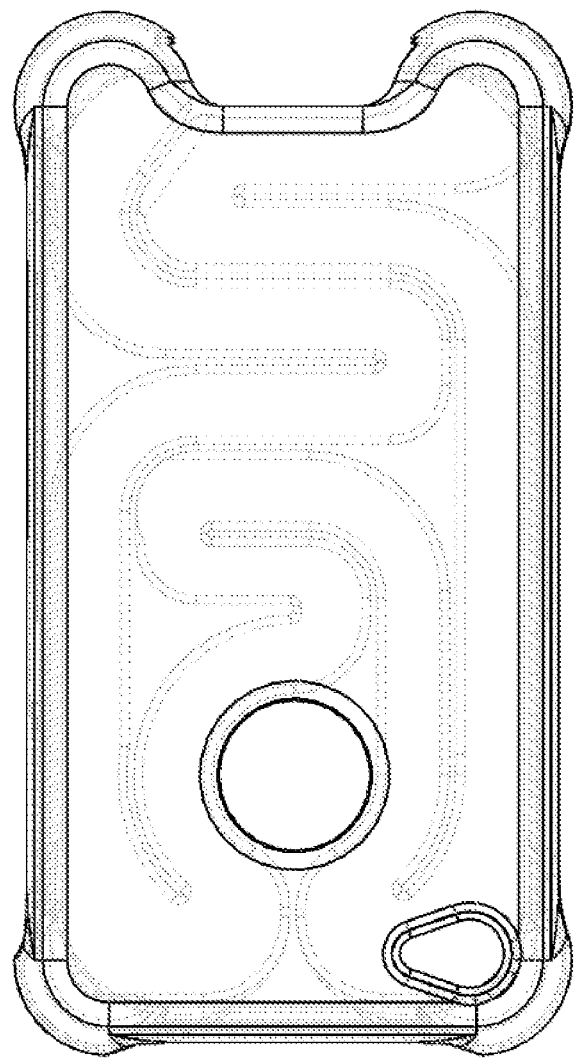
FIG. 12 is a similar view to FIG. 11 with the channel shown in phantom lines.

As best understood from FIGS. 9 and 10, in addition to pockets 14, 16, 18, and 20, which provide a space between the cover and the device, cover 10 forms a space between the cover and the back side of the device at the respective pockets as well as along the perimeter of the device, for example, by way of channel 10d, shown on FIG. 11. Therefore, in addition to providing a sound duct, cover 10 also protects device D from impact by providing a space between the cover and the device at strategic locations around the device, which allows the cover to absorb energy should the device be dropped or impacted at least where the device is protected by the cover.

Figure 15:
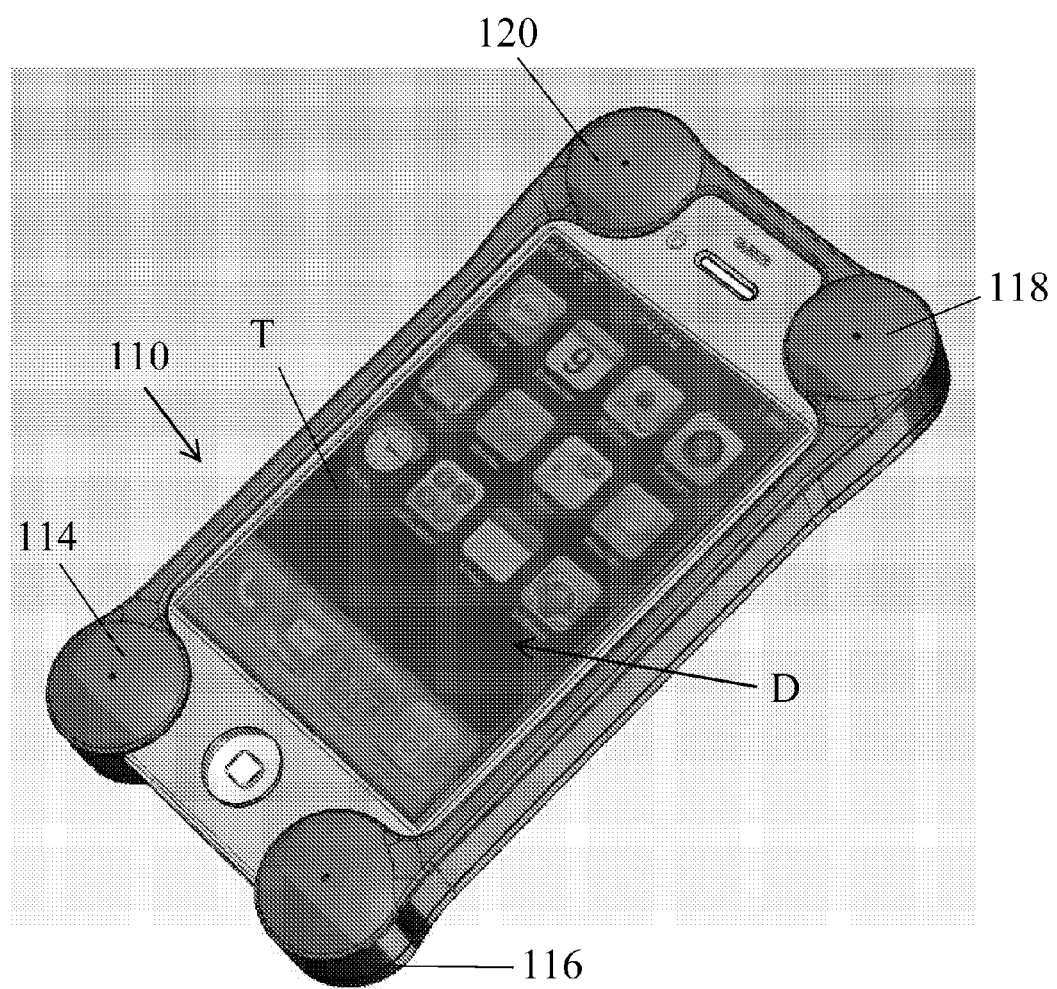
FIG. 15 is a perspective view of another embodiment of a cover of the present invention shown mounted over a handheld device, such as a cell phone.
Figure 16:
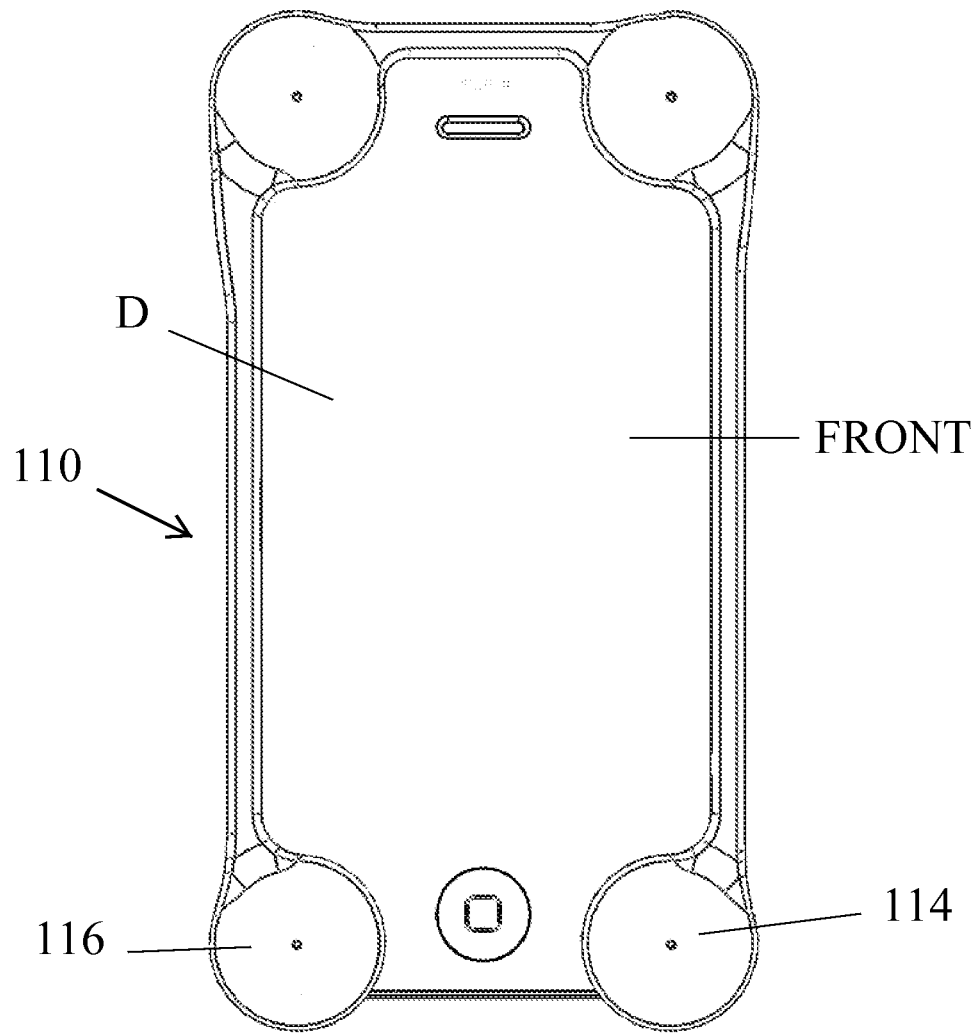
FIG. 16 is a top plan view of the cover and device of FIG. 15.
Figure 17:
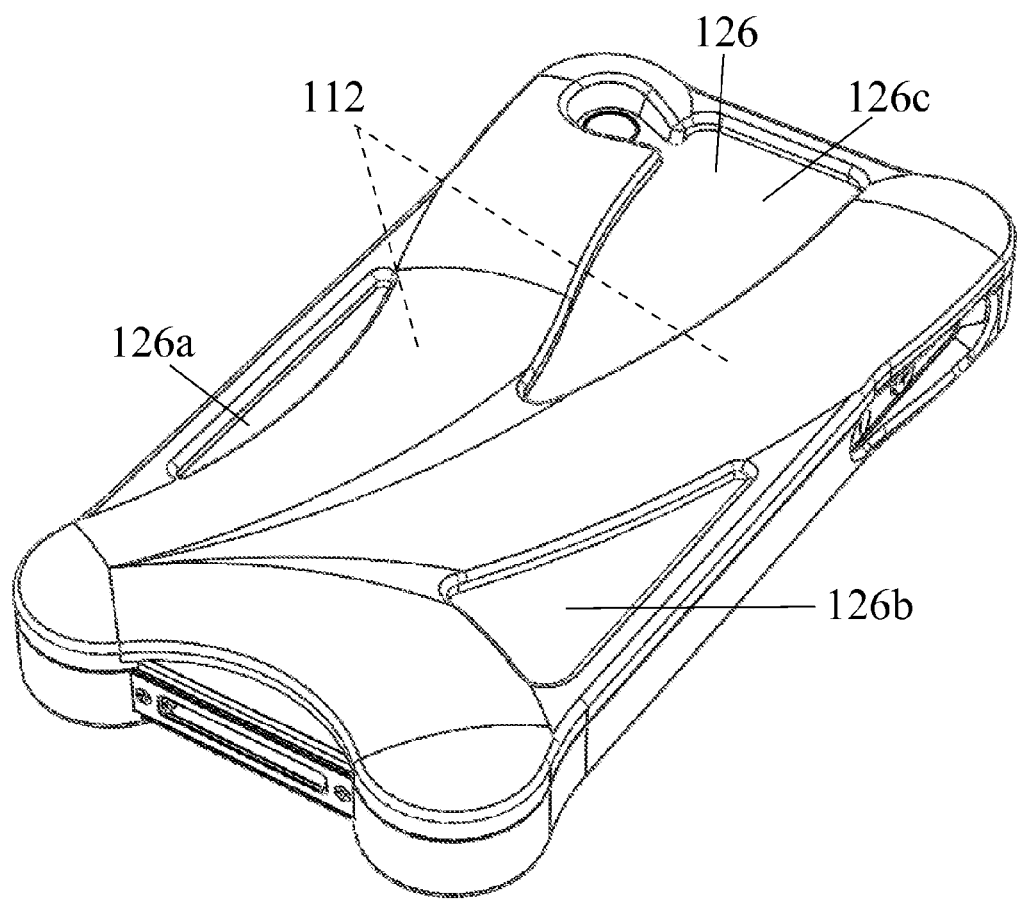
FIG. 17 is a bottom perspective view the cover and device of FIG. 15.
Figure 17A:
FIG. 17A is a similar view to FIG. 17 showing shading of the cover.
Figure 18:
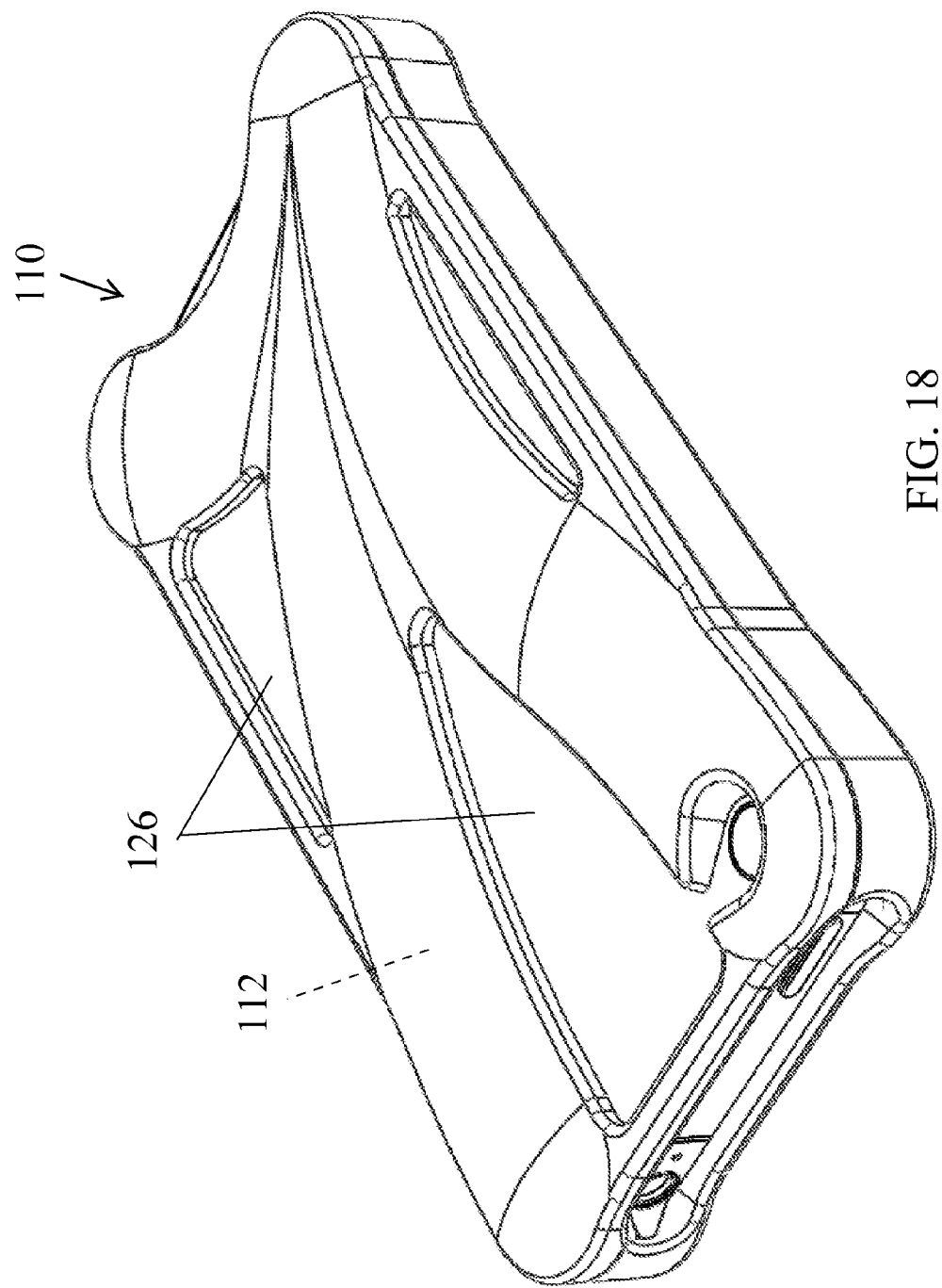
FIG. 18 is a another perspective view of the cover and device of FIG. 17.
Figure 19:
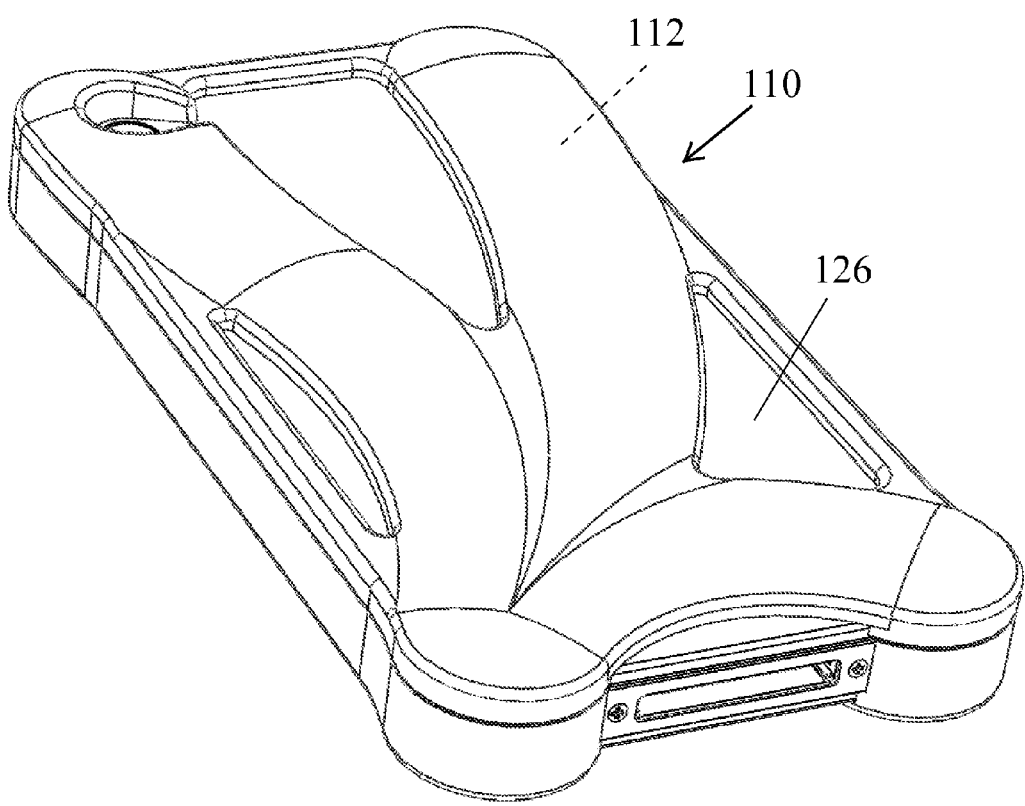
FIG. 19 is another perspective view of the cover and device of FIG. 15.
Figure 20:
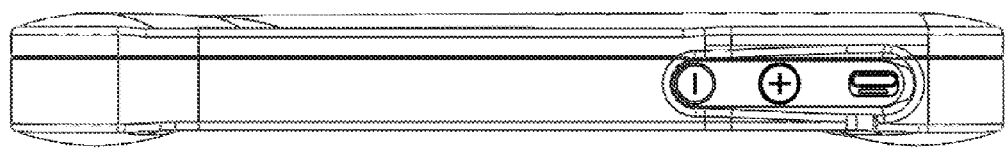
FIG. 20 is a side elevation view of the cover and device of FIG. 15.
Figure 21:
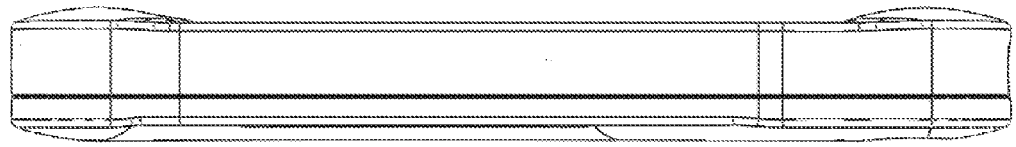
FIG. 21 is a right side elevation view of the cover and device of FIG. 15.
Figure 22:
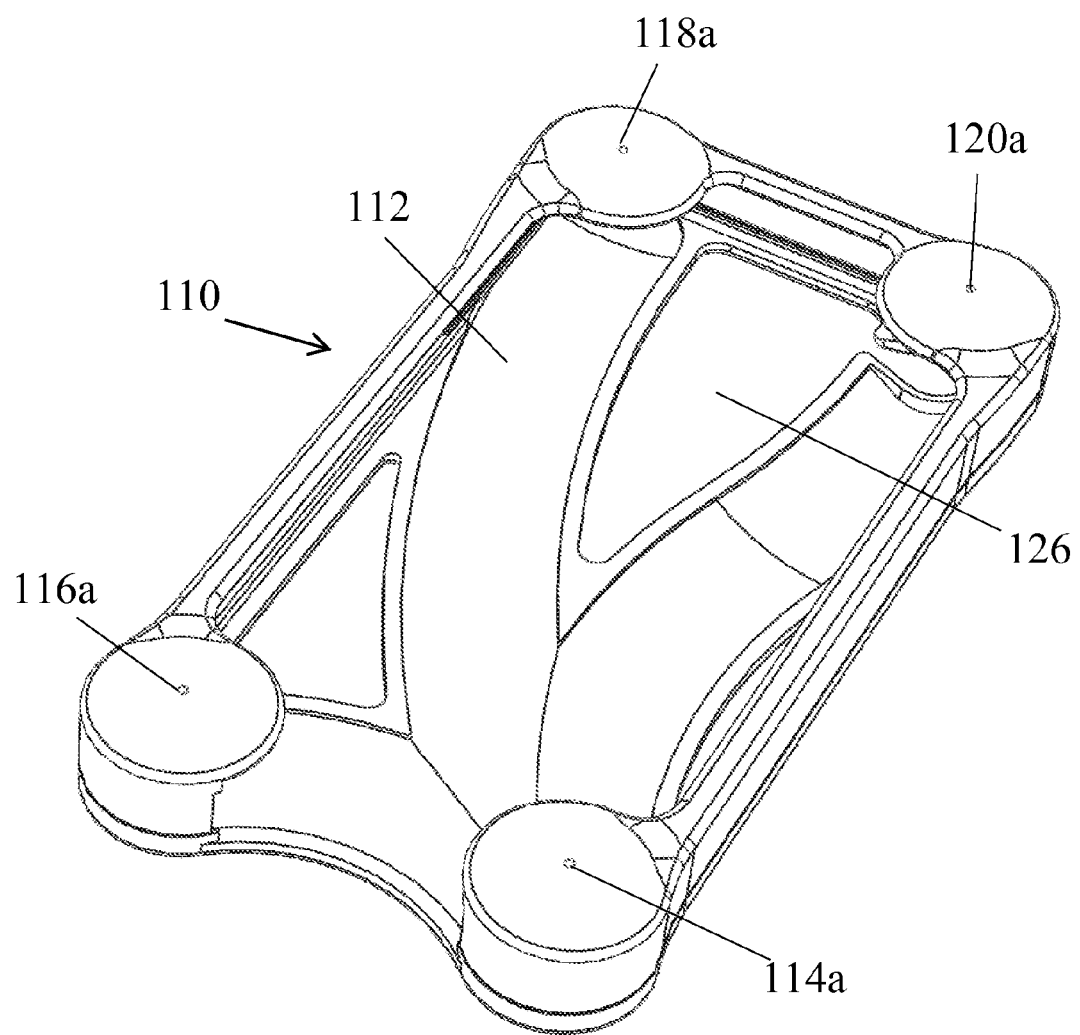
FIG. 22 is a top perspective view illustrating the cover with the device removed to show the inwardly facing side of the bottom wall of the cover.
Figure 23:
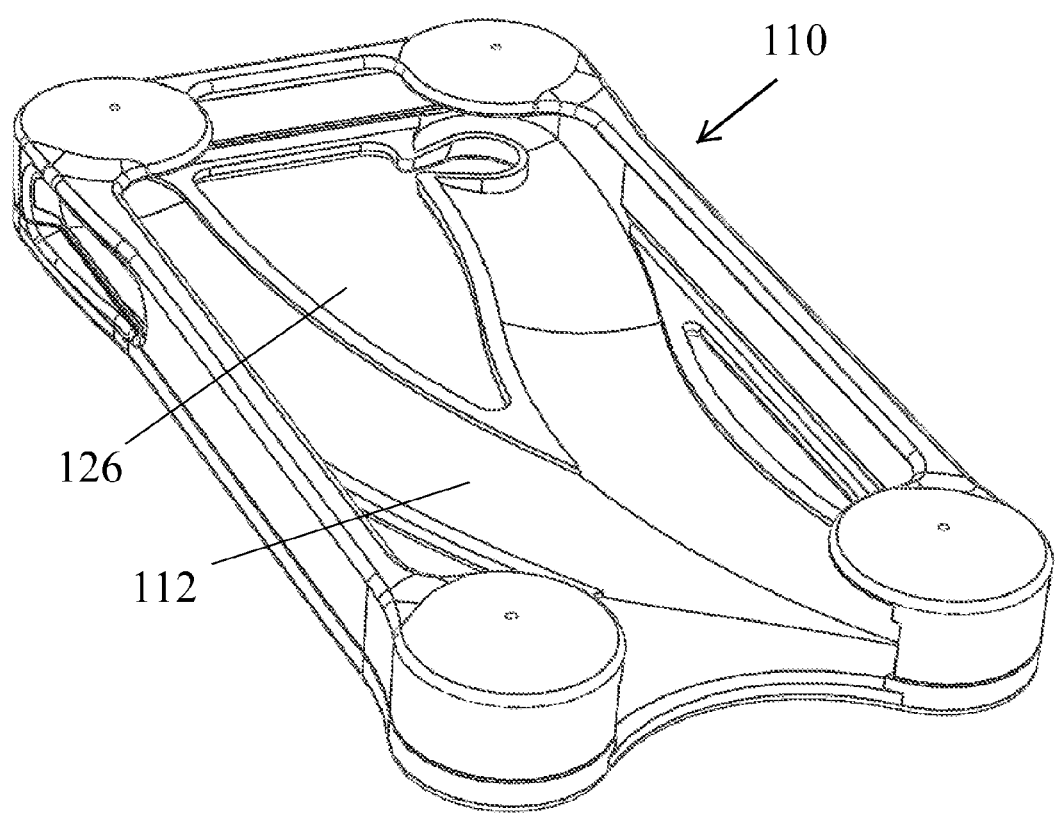
FIG. 23 is a second perspective of the cover of FIG. 21.
Figure 24:
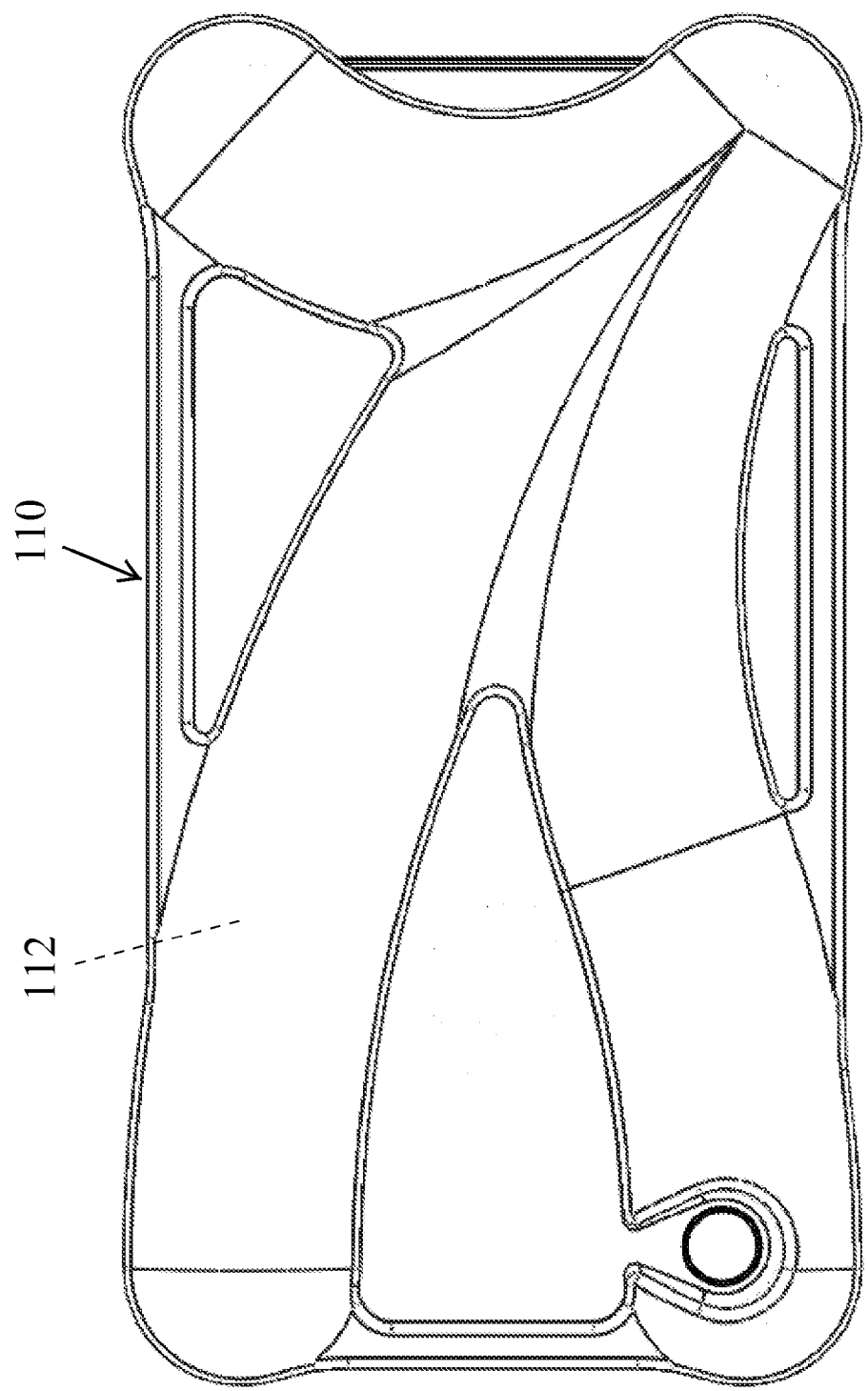
FIG. 24 is a bottom plan view of the cover of FIG. 20.

Referring to FIG. 15, the numeral 110 designates another embodiment of the present invention. Cover 110 similarly incorporates a channel 112 in its back wall 126 that forms a sound duct when the cover is mounted on a device. Cover 110 incorporates cylindrical-shaped pockets 114, 116, 118, and 120 at each of its corners to extend over one or more speakers and, further, to form protection for the device.

In the illustrated embodiment, channel 112 projects outwardly from back wall 126 to form recessed areas 126a, 126b, and 126c, whose perimeters may then form the sealing surfaces for sealing against the back side of the device. These recessed areas may also include openings.

Optionally, each pocket 114, 116, 118, and 120 may include openings 114a, 116a, 118a, and 120a to provide the outlet ports to emit the channeled sound, which are spaced around the perimeter of the device.

Figure 25:
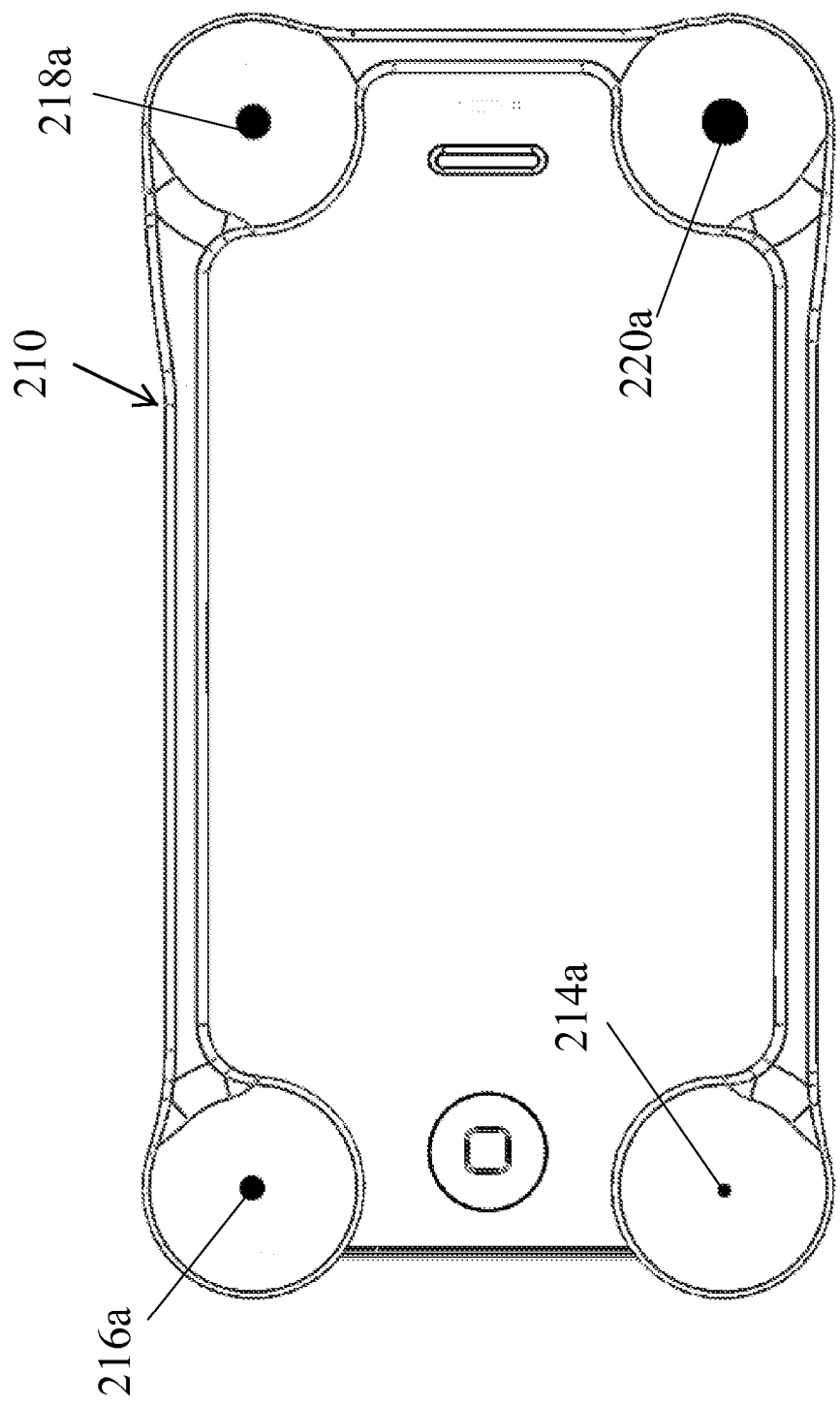
FIG. 25 is a top plan view of another embodiment of the cover of FIG. 16 illustrating the cover incorporating sound emitting openings in the forward facing side of the cover.

Referring to FIG. 25, the numeral 210 generally designates another embodiment of a cover of the present invention. Cover 210 is similar to cover 110 but includes openings 214a, 216a, 218a, and 220a with different diameters to thereby adjust the audio output at various locations around the device.

Figure 26:
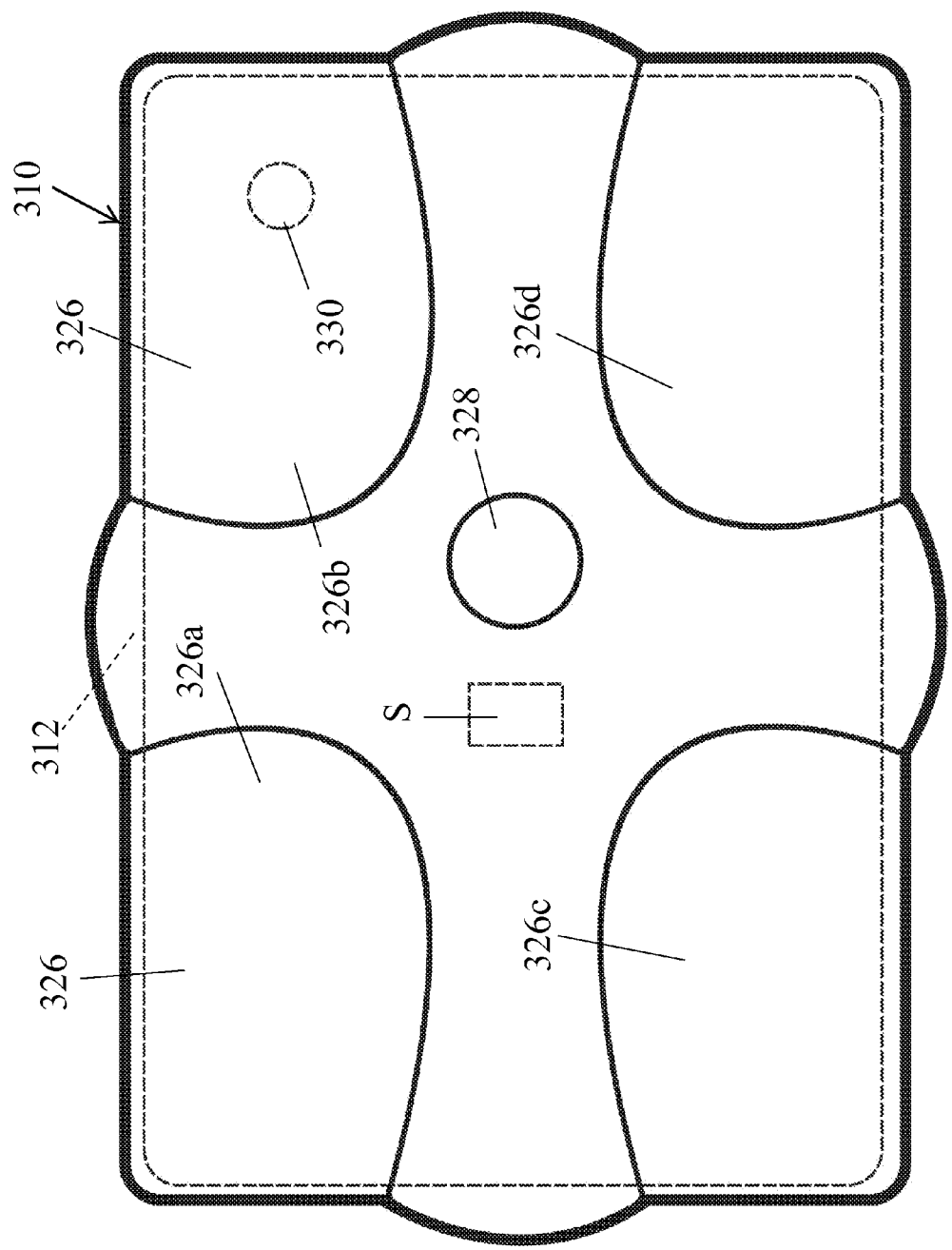
FIG. 26 is a plan view of another configuration of the cover of the present invention, which is adapted for covering the back side of another handheld device, such as a pad.
Figure 27:
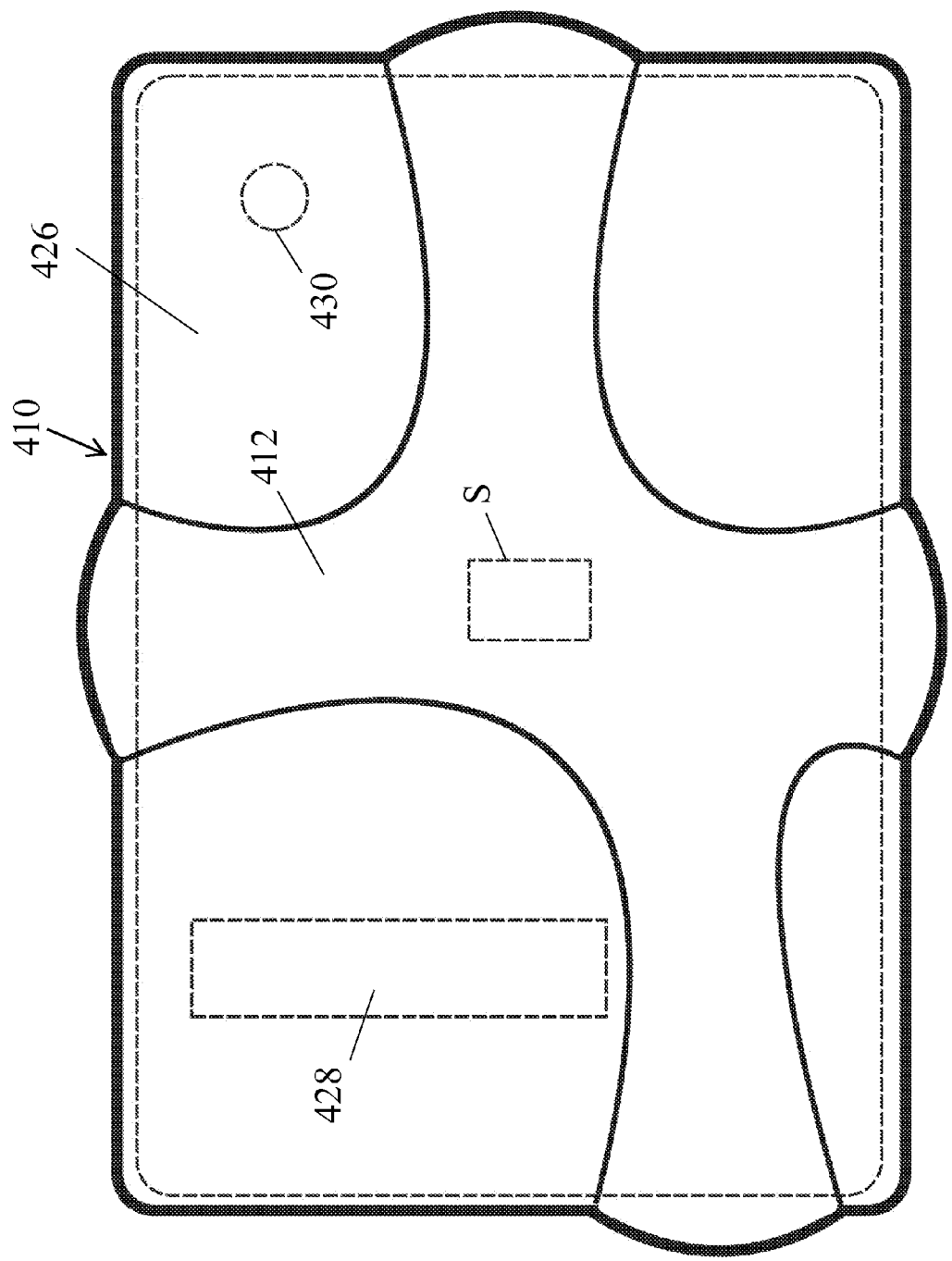
FIG. 27 is yet another embodiment of the cover of the present invention also configured for covering the back side of a handheld device in the form of a pad.
Figure 28:
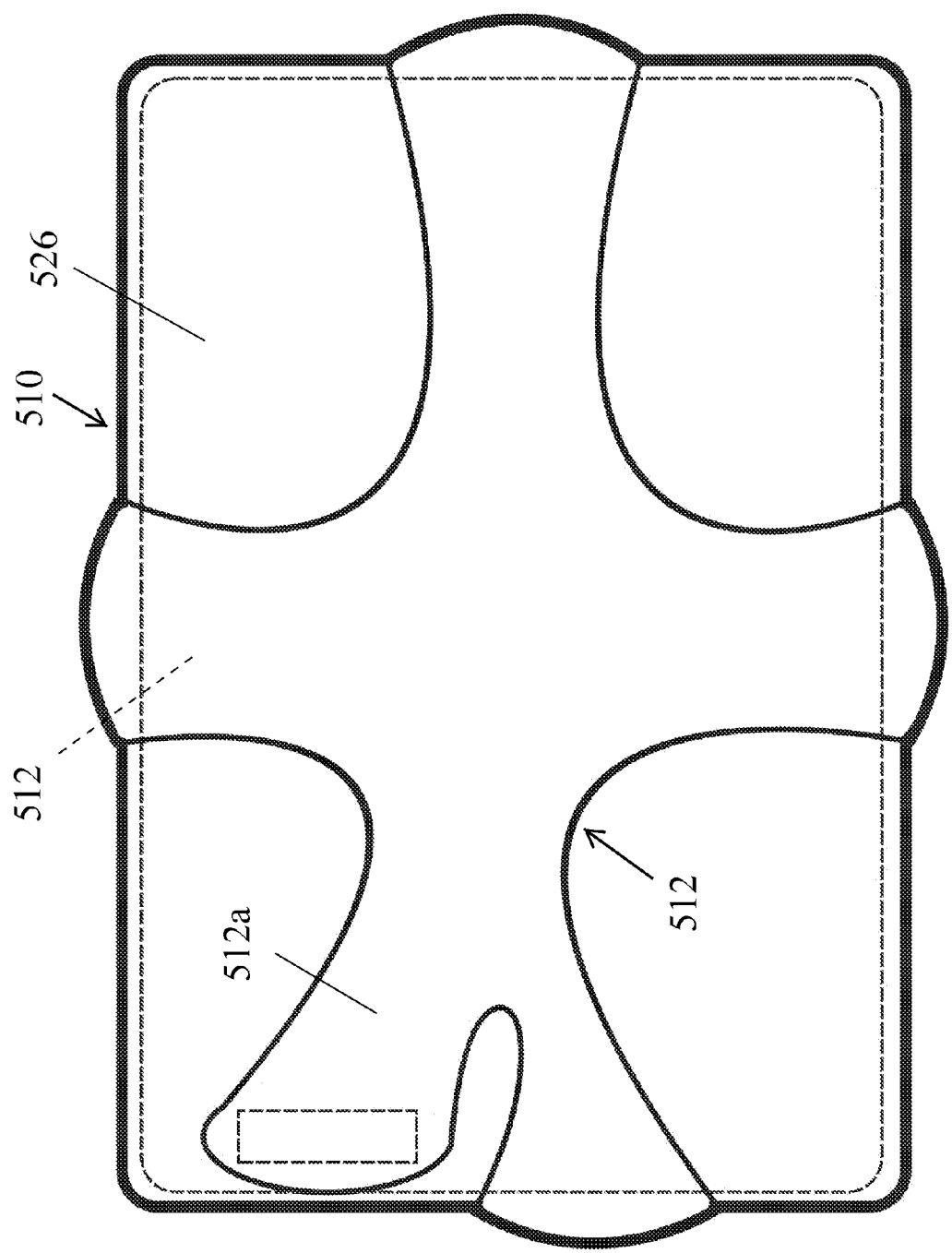
FIG. 28 is another embodiment of the cover of the present invention configured for covering the back side of a handheld device, such as a pad.

Referring to FIGS. 26-28, the numerals 310, 410, and 510 generally designate additional embodiments of a cover of the present invention. Covers 310, 410, and 510 are configured to cover larger hand-held electronic devices, such as pads. Each cover similarly incorporates channels 312, 412, 512 that form sound ducts between the back side of the device and the cover back wall 326, 426, and 526. Like the channels in the previous covers, the channels are configured to channel sound waves from one or more speakers of the device to one or more locations around the perimeter of the front facing side of the device.

For example cover 312 includes a back cover with a cross-shaped channel 312 with arms that extend from the central portion of the back wall to medial portions of each side of the device. Each arm of the channel is then is in communication with ports that are located on the front facing side of the device, which may be formed from similar structures described in reference to the previous embodiments. Further, channel 312 may similarly project outwardly from the cover base wall 326. The recessed regions 326a, 326b, 326c, 326d adjacent channel 312 may be solid or may have openings (e.g. 330 for a camera). Similarly, one or more openings 328 may be provided in channel 312, for example, to accommodate a logo or a device.

Cover 410 is similar to cover 310 but with an asymmetrical cross-shape channel where the ports are offset along at least one side of the device. Again, cover 410 may incorporate a plurality of openings (e.g. 428, 430) to accommodate, for example, a phone stand leg or a camera.

Cover 510 also incorporates an asymmetrical cross-shaped channel 512 but with an extra leg 512a to extend over a speaker located at the back of the device (but toward the perimeter at one of the corners of the device).

While several forms of the invention have been shown and described, other changes and modifications will be appreciated by those skilled in the relevant art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are define as follow:

1. A hand-held protective cover for a hand-held device, the hand-held device having a housing and a speaker located in the housing, the housing having a back side and an outer perimeter defining four corners, said hand-held protective cover comprising:
   a hand-held cover body, when said cover is mounted to the hand-held device said cover body having a back wall adjacent the housing and for covering and for enclosing the speaker, and said cover body including a perimeter wall, said perimeter wall configured to extend around the perimeter of the housing and to cover each of the corners of the housing when said cover body is mounted to the hand-held device to protect the hand-held device from impact, and said cover body including at least one opening formed therein to form a sound outlet; and
   a channel, when said cover is mounted to the housing said channel positioned adjacent the back side of the housing between said back wall and the housing, and said channel having an open side for facing the back side of the housing and for forming at least one sound duct with the back side of the housing, said sound duct in communication with said outlet and forming an inlet in communication with the speaker when said cover is mounted to the housing wherein the sound waves emitted by the speaker are directed into said inlet and then into said sound duct, said sound duct increasing in its cross-section along its length for concentrating the sound waves from the speaker and for directing the concentrated sound waves to said outlet, and said outlet being at a location remote from the speaker but within or at the outer perimeter of the housing so that said outlet does not protrude from the hand-held device when said cover is mounted to the hand-held device.

2. The cover according to claim 1, wherein said cover body includes said channel.

3. The cover according to claim 1, said perimeter wall of said cover body includes one or more recesses or openings to accommodate one or more ports on the hand-held device when said cover is mounted to the hand-held device.

4. The cover according to claim 3, wherein said back wall includes said channel.

5. The cover according to claim 1, in combination with a handheld device, said device having a housing, a display screen, and a speaker, said housing having a back side and a front side, said display screen at said front side, and said cover being mounted at said back side of said housing wherein said channel is adjacent said back side of said housing.

6. The cover according to claim 5, wherein said channel has a sealing lip, said sealing lip sealing against said back side of said housing when said cover is mounted to said device.

7. The cover according to claim 1, wherein said cover is configured to seal around the speaker when the cover is mounted to the hand-held device for directing all of the sound waves emitted from the speaker into the channel.

8. The hand-held protective cover according to claim 1, wherein said back wall includes another surface, said outer surface of said back wall being flat.

9. The hand-held protective cover according to claim 1, wherein said cover body includes two or more of said openings forming a plurality of sound outlets, and said sound duct being in communication with said plurality of sound outlets.

10. A hand-held protective cover for a hand-held device, the hand-held device having a housing and a speaker, the housing having a back side and a perimeter wall, the perimeter wall forming perimeter corners of the hand-held device, said hand-held protective cover comprising:
   a hand-held cover body, said cover body configured for covering a portion of the housing and for covering all perimeter corners of the hand-held device to protect the hand-held device and for enclosing the speaker when said cover is mounted to the hand-held device; and
   said cover body having a back wall forming a channel for positioning adjacent the back side of the housing, said channel adapted to be in communication with the speaker when said cover is mounted to the housing wherein the sound waves emitted by the speaker and from the housing are directed into said channel, said channel forming a non-linear, convoluted sound duct having a length greater than a length of the back wall for concentrating the sound waves from the speaker and for directing the concentrated sound waves to a sound outlet formed by said cover body at a location remote from the speaker but inward of a side or at an edge of the housing wherein said sound outlet does not protrude from the hand-held device when said cover is mounted to the hand-held device.

11. The hand-held protective cover according to claim 10, wherein the back wall includes an outer surface, the outer surface of the back wall being free of any mounting structures.

12. The hand-held protective cover according to claim 10, wherein the back wall includes an outer surface, said outer surface of said back wall being flat.

13. A hand-held electronic device assembly comprising:
   a hand-held electronic device including a housing and a speaker located in the housing, the housing having a back side and an outer perimeter defining two longitudinal sides and two transverse sides and four corners; and
   a hand-held protective cover mounted to said housing, said cover comprising:
      a cover body having a back wall covering at least a portion of said back side of said housing and a perimeter wall being immediately adjacent said perimeter of said housing and covering said four corners of said housing, said cover body covering and enclosing said speaker; and
      said cover body having a sound outlet and a channel positioned adjacent said back side of said housing, said sound outlet at a location remote from said speaker but within the outer perimeter or at the outer perimeter of said housing wherein the sound outlet does not protrude from the housing, said channel in communication with said speaker and further being in communication with said outlet, said channel having a length extending from said inlet to said sound outlet, said channel further having an open side extending along said length and facing the back side of the device body wherein said channel and said back side of device body form a sound duct there between and said channel increasing in cross-section along its length wherein the sound waves emitted by said speaker are directed into said channel and concentrated at said sound outlet.

14. The hand-held electronic device assembly according to claim 13, wherein said cover body includes two of said sound outlets.

15. The hand-held electronic device assembly according to claim 13, wherein said perimeter wall of said cover body includes at least one access opening or recess aligned with a port provided in said housing of said hand-held electronic device.

16. The hand-held electronic device assembly according to claim 15, wherein said channel is convoluted.

17. The hand-held electronic device assembly according to claim 13, wherein the channel extends from near one end of said housing to said outlet, said outlet being located at or near another end of said housing.

18. The hand-held electronic device assembly according to claim 17, wherein said channel has a sealing lip or edge, said sealing lip or edge sealing against said back wall of said housing.

19. The hand-held electronic device assembly according to claim 13, wherein said cover is configured to seal around said speaker when said cover is mounted to said housing for directing substantially all of the sound waves emitted from said speaker into said channel.

* * * * *